(12) United States Patent
Nansen et al.

(10) Patent No.: US 7,621,437 B2
(45) Date of Patent: Nov. 24, 2009

(54) BRAZED STRUCTURAL ASSEMBLY AND ASSOCIATED SYSTEM AND METHOD FOR MANUFACTURE

(75) Inventors: David S. Nansen, Bridgeport, WV (US); Marc R. Matsen, Seattle, WA (US); Terry L. Smith, Kennewick, WA (US); William R. Herb, Seattle, WA (US); Ronald W. Brown, Des Moines, WA (US); Lee C. Firth, Renton, WA (US)

(73) Assignee: The Boeing Company, Chicago, IL (US)

( * ) Notice: Subject to any disclaimer, the term of this patent is extended or adjusted under 35 U.S.C. 154(b) by 280 days.

(21) Appl. No.: 11/059,287

(22) Filed: Feb. 16, 2005

(65) Prior Publication Data

US 2006/0180705 A1    Aug. 17, 2006

(51) Int. Cl.
   B23K 1/002     (2006.01)
   B23K 1/00      (2006.01)
   B23K 3/00      (2006.01)

(52) U.S. Cl. ............... 228/234.1; 228/212; 228/249; 228/262.72

(58) Field of Classification Search ............... None
See application file for complete search history.

(56) References Cited

U.S. PATENT DOCUMENTS

| | | | |
|---|---|---|---|
| 4,622,445 A | 11/1986 | Matsen | |
| 4,851,188 A * | 7/1989 | Schaefer et al. | 419/9 |
| 5,286,560 A * | 2/1994 | Fishkis et al. | 428/357 |
| 5,410,132 A | 4/1995 | Gregg et al. | |
| 5,410,133 A | 4/1995 | Matsen et al. | |
| 5,420,400 A | 5/1995 | Matsen | |
| 5,530,227 A | 6/1996 | Matsen et al. | |
| 5,571,436 A | 11/1996 | Gregg et al. | |
| 5,587,098 A | 12/1996 | Matsen et al. | |
| 5,591,369 A | 1/1997 | Matsen et al. | |
| 5,591,370 A | 1/1997 | Matsen et al. | |
| 5,599,472 A | 2/1997 | Brown et al. | |
| 5,645,744 A | 7/1997 | Matsen et al. | |
| 5,683,607 A | 11/1997 | Gillespie et al. | |

(Continued)

OTHER PUBLICATIONS

Rawal, Article: Metal-Matrix Composites for Space Applications, 2001, JOM 54*4) (2001), pp. 14-17.*

(Continued)

*Primary Examiner*—Jennifer McNeil
*Assistant Examiner*—Jason L Savage
(74) *Attorney, Agent, or Firm*—Alston & Bird LLP

(57) ABSTRACT

A structural assembly and an associated system and method for manufacture are provided. The structural assembly includes an elongate member and a first connector member that is connected to an end of the elongate member by a braze joint. A second connector member can be connected to an end of the elongate member opposite the first connector by another braze joint. The elongate member is formed of a metal matrix composite material that includes a plurality of fibers of a reinforcement material disposed in a metal matrix. Each connector member is formed of a material that is dissimilar to the material of the elongate member. The braze joints can be formed by selectively heating the braze material, e.g., with an inductive coil that extends circumferentially around only a portion of the structural assembly.

16 Claims, 7 Drawing Sheets

U.S. PATENT DOCUMENTS

| | | | |
|---|---|---|---|
| 5,683,608 A | 11/1997 | Matsen et al. | |
| 5,700,995 A | 12/1997 | Matsen | |
| 5,705,794 A | 1/1998 | Gillespie et al. | |
| 5,728,309 A | 3/1998 | Matsen et al. | |
| 5,747,179 A | 5/1998 | Matsen et al. | |
| 5,777,299 A | 7/1998 | Dominici | |
| 5,793,024 A | 8/1998 | Matsen et al. | |
| 5,808,281 A | 9/1998 | Matsen et al. | |
| 5,821,506 A | 10/1998 | Matsen | |
| 5,914,064 A | 6/1999 | Gillespie et al. | |
| 6,040,563 A | 3/2000 | Matsen et al. | |
| 6,087,640 A | 7/2000 | Gillespie et al. | |
| 6,180,932 B1 | 1/2001 | Matsen et al. | |
| 6,211,497 B1 | 4/2001 | Matsen et al. | |
| 6,528,771 B1 | 3/2003 | Matsen et al. | |
| 6,566,635 B1 | 5/2003 | Matsen et al. | |
| 6,648,206 B2 * | 11/2003 | Nelson et al. | 228/112.1 |
| 6,722,041 B2 * | 4/2004 | Warashina et al. | 30/276 |
| 6,855,917 B2 | 2/2005 | Matsen et al. | |
| 7,269,986 B2 * | 9/2007 | Pfaffmann et al. | 72/60 |
| 2004/0200550 A1 * | 10/2004 | Pfaffmann et al. | 148/526 |
| 2005/0233162 A1 * | 10/2005 | Joseph et al. | 428/609 |
| 2006/0050762 A1 * | 3/2006 | Richardson | 373/150 |

OTHER PUBLICATIONS

*Controlled Atmosphere Brazing Systems*, Induction Atmospheres, available at http://www.inductionatmospheres.com/cont_atmos_brazing.html; Jun. 11, 2004, 2 pages.

*Brazing Metal With Induction Heating*, Ameritherm Inc. Precision Induction Heating, available at http://www.ameritherm.com/overview_brazing.html, Jun. 11, 2004, 3 pages.

Press Release, *Metal Matrix Composite Landing Gear Component for Performance under Extremes Press Release*, SP Aerospace Geldrop, The Netherlands, F16 Metal Matrix Drag Brace, Jun. 2003, 3 pages.

* cited by examiner

BRAZED STRUCTURAL ASSEMBLY AND ASSOCIATED SYSTEM AND METHOD FOR MANUFACTURE

BACKGROUND OF THE INVENTION

1. Field of the Invention

The present invention relates to the joining of structural members and, more particularly, relates to the brazing of structural members to form a structural assembly such as an elongate member joined with at least one connector.

2. Description of Related Art

The selection of material for forming a structural member is typically based, at least in part, on the material's properties such as strength, stiffness, toughness, corrosion resistance, and the like. For some structural members, the choice of material is limited by the required properties. For example, braces, struts, connecting rods, and the like are typically elongate, rod- or beam-like components that define connection portions at the opposite ends. The elongate portion of such a structural member generally requires high axial strength so that the member can transmit loads between the opposite ends. Each of the connection portions at the ends of the member can be an aperture, a slot, a clevis, or the like, often requiring greater strength in the non-axial direction than the elongate portion. In some cases the connection portions are formed with a cross-sectional size, i.e., transverse to the axial direction of the member, that is larger than the cross-sectional size of the elongate portion so that the connection portions provide sufficient strength for connecting to other devices and transmitting loads through the structural member.

However, in many cases, the size, weight, or other characteristics of the structural member are limited by the application. For example, in the case of a strut for a landing gear assembly, the strut must meet dimensional requirements while also providing high strength at a minimum weight. In fact, the strength and dimensional requirements for the connection portions may require a high strength material, such as certain types of steel. A material that provides the necessary characteristics for the connection portions may also provide sufficient strength for use in the elongate portion of the structural member. Nevertheless, the material may be less than optimal for use in the elongate member. For example, if the elongate member is used primarily to transmit loads in the axial direction, a high axial strength may be necessary while equal strengths in other dimensions are not required. That is, the elongate portion can be formed of a material that is optimized to provide the specific strength required by the elongate portion, e.g., a composite material that provides a high strength in a specific direction. However, if the same composite material does not provide the necessary characteristics for use in the connection portions, the composite material may be unsuitable for the structural member. Further, forming composite materials to a more complicated geometry, as is often required for the connection portions, can significantly increase the time and/or cost for manufacture.

Thus, there exists a need for an improved structural assembly, as well as a method and system for manufacturing the structural assembly. The structural assembly should be compatible for use as a rod- or beam-like device that transmits loads, such as brake rods, engine braces, landing gear struts, landing gear braces, and the like. The structural assembly should provide an elongate portion that possesses certain properties and at least one connection portion that defines properties that are at least partially different than the elongate portion.

SUMMARY OF THE INVENTION

The present invention provides a structural assembly as well as an associated system and method for manufacturing a structural assembly. The structural assembly includes an elongate member and at least one connector member that is connected to the elongate member by a braze joint. For example, a first connector can be connected to a first end of the elongate member and a second connector member can optionally be connected to a second end of the elongate member opposite the first connector member by a braze joint. The elongate member is formed of a metal matrix composite material including a plurality of fibers of a reinforcement material disposed in a metal matrix. Each connector member is formed of a material that is dissimilar to the material of the elongate member. For example, the elongate member can be formed of an anisotropic metal matrix composite material that is strongest in the axial direction, while each connector member is formed of a substantially isotropic material having similar strengths in the axial and non-axial directions as required by the expected loading of the respective members.

The braze joint can provide a metallurgical joint that is typically stronger and has better fatigue resistance that adhesive or press fitted joints. In addition, the electrical and thermal capabilities of such a brazed joint can be better than adhesive or press fit joints. That is, the brazed joint can perform better at high and low temperatures than non-metallurgical joints. Thus, the present invention provides a cap-braze-MMC-braze-cap product that is the functional equivalent or superior to conventional cap-MMC-cap products.

According to one embodiment of the present invention, the metal matrix composite material of the elongate member is stronger in at least one dimension than the material of the first connector member. However, the material of the first connector member can be stronger in at least one dimension than the matrix material of the composite material of the elongate member. For example, the fibers of the reinforcement material can be disposed generally in the axial direction of the elongate member so that the elongate member is strongest in the axial direction, e.g., to transmit loads axially through the assembly. The reinforcement material can include silicon carbide, which can be disposed in a matrix material that includes titanium. Each connector member can be formed of a heat treated material such as heat treated steel.

According to one aspect of the present invention, the elongate member is tubular, such as a tubular cylinder, and the first connector member can define an aperture for receiving one of the ends of the elongate member. The structural assembly can be, for example, a brake rod, an engine brace, a landing gear strut or brace, or the like.

The members are typically formed with dimensions that are appropriate for carrying specific loads. The metal matrix composite material of the elongate member can provide a particular strength with a reduced mass relative to other materials, e.g., a thinner wall thickness in the case of a tubular member.

The present invention also provides a method of manufacturing a structural assembly. The method includes providing an elongate member and a first connector member. The elongate member, which extends in an axial direction between first and second ends, is formed of a metal matrix composite material that includes a plurality of fibers of a reinforcement material disposed in a metal matrix. The connector member is formed of a material dissimilar to the metal matrix composite material of the elongate member. A braze material is melted and received between the connector and elongate members to join the members. A second connector member, which is also formed of a material dissimilar to the metal matrix material of the elongate member, can be similarly brazed to an end of the elongate member opposite the first connector member.

According to one aspect of this method, the metal matrix composite material of the elongate member can be formed stronger in at least one dimension than the material of the first connector member, and the material of each connector member can be formed to be stronger in at least one dimension than the matrix material of the elongate member. For example, the fibers of the reinforcement material, which can include silicon carbide, can be disposed in a generally axial direction in the matrix material, which can include titanium. Further, each connector member can be heat treated before the braze material is melted and can remain cool enough during the brazing operation so that each connector member remains heat treated. For example, the braze material can be selectively heated so that at least a portion of each connector member remains cooler than the melting temperature of the braze material. In particular, the braze material can be selectively heated by generating an electromagnetic field to inductively heat the braze material. In this regard, a portion of the members can be disposed in an induction coil so that the braze material is heated while at least a portion of each connector member is disposed outside the induction coil and remains cooler than the melting temperature of the braze material.

The present invention also provides a system for selectively induction heating a braze material to form a braze joint between at least two structural members to form a structural assembly. The system comprises a vessel configured to be substantially sealed to define a space and a gas source configured to provide an inert gas to the space of the vessel. A support structure is provided for supporting the structural members in a desired configuration with a braze material. An induction coil is provided proximate to the vessel and configured to selectively heat the braze material to a brazing temperature to melt the braze material while at least a portion of the structural members remains cooler than the brazing temperature. For example, the induction coil can extend circumferentially around the vessel and axially along only a portion of the vessel so that the induction coil is configured to heat the braze material disposed radially within the induction coil. The induction coil is typically configured to receive a coolant to thereby control the temperature of the coil while the braze material is heated.

The brazing operation of the present invention can typically be performed relatively quickly and efficiently. In addition, the method can allow the use of connector members which are formed of materials that provide favorable wear characteristics but that may be difficult to join by other connection methods. Further, the joints can be formed by local heating, i.e., without heating the entire elongate member, thereby potentially reducing the time and energy required.

BRIEF DESCRIPTION OF THE DRAWINGS

The foregoing and other advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth; rather, these embodiments are provided so that this disclosure will be thorough and complete, and will fully convey the scope of the invention to those skilled in the art. Like numbers refer to like elements throughout.

Figure 1:
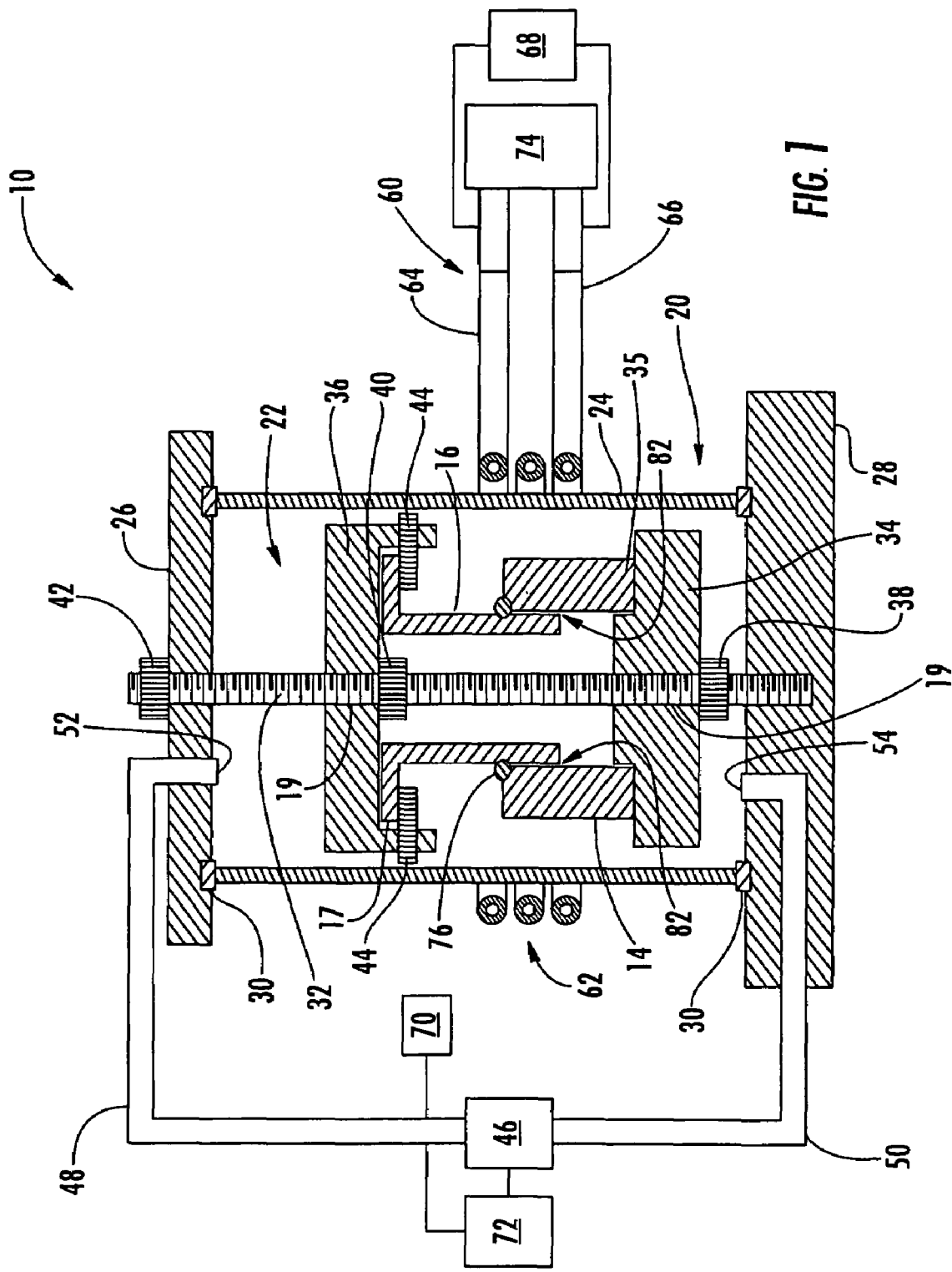
FIG. 1 is section view schematically illustrating a system for forming a joint between structural members to form a structural assembly according to one embodiment of the present invention.
Figure 5:
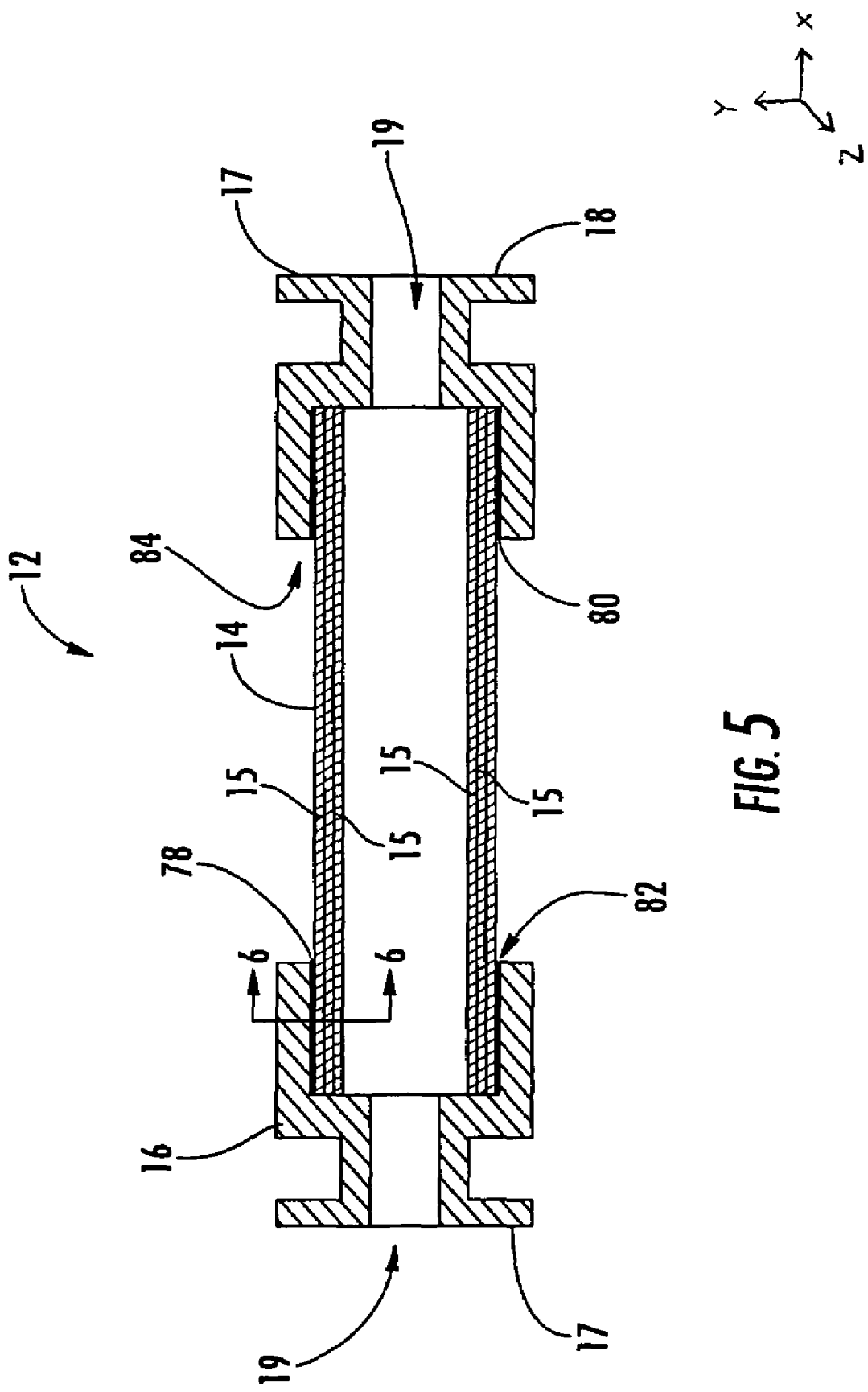
FIG. 5 is a section view illustrating a structural assembly according to one embodiment of the present invention.
Figure 7:
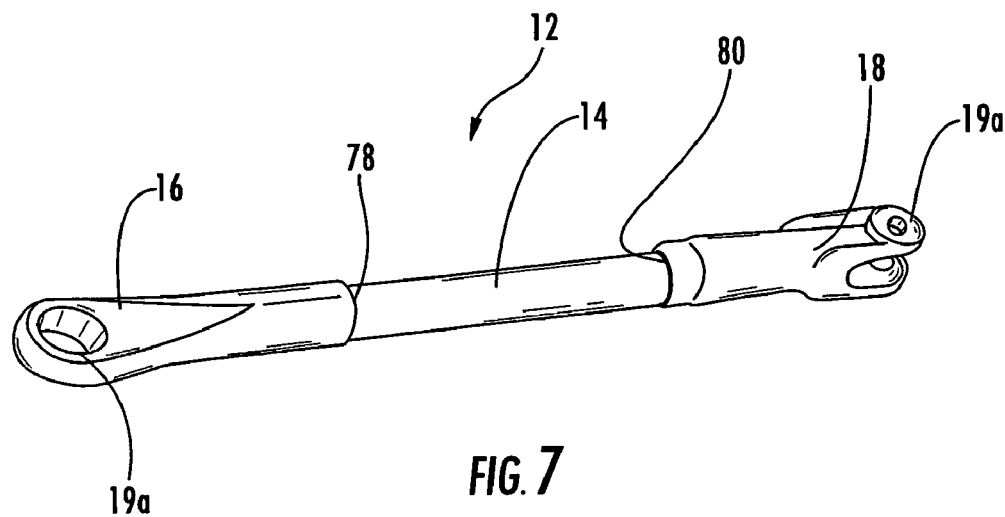
FIG. 7 is a perspective view illustrating a structural assembly according to another embodiment of the present invention.
Figure 8:
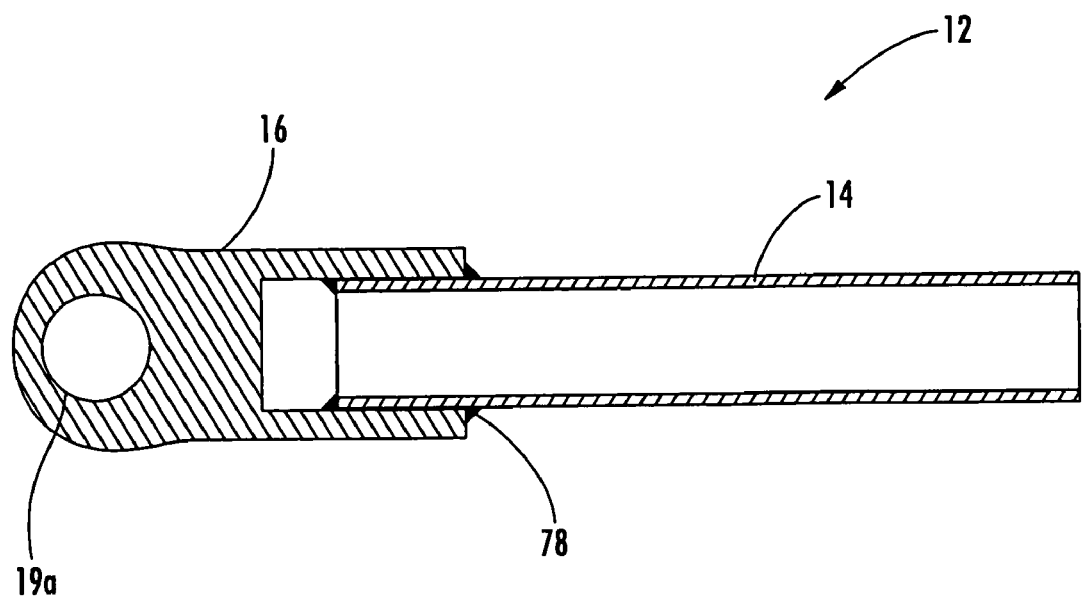
FIG. 8 is a section view illustrating the structural assembly of FIG. 7.

Referring now to the drawings, and in particular to FIGS. 1 and 5, a system 10 for joining structural members to form a structural assembly 12 typically includes an elongate member (an arm) 14 and connectors 16, 18 at its ends. Structural assemblies of various configurations can be formed according to the present invention. Typically, the structural assembly includes an elongate member and at least one connector member. For example, FIG. 5 illustrates a structural assembly 12 according to one embodiment of the present invention, including an elongate member 14 and connector members 16, 18 disposed at the ends of the elongate member 14. Similarly, FIGS. 7 and 8 illustrate another embodiment of the structural assembly 12 defining transverse apertures 19a through each connector member 16, 18 for connecting the members 16, 18 to other devices or structures. Thus, the structural assembly 12 can be used to connect two portions of a device or structure by connecting each of the connector members 16, 18 to a respective portion of the device or structure. For example, the structural assembly 12 can be a brace, strut, connecting rod, or the like, which can be used in a variety of applications including, but not limited to, as a brake rod, an engine brace, a landing gear strut, a landing gear brace, and the like. The structural assemblies of the present invention can be used in vehicles, such as aircraft, automobiles, and marine craft, in buildings or other structures, and the like.

The system 10 has a sealable container, i.e., a vessel 20 that can at least partially receive the structural members 14, 16, 18 and provide a substantially hermetically sealed space 22 for the joining operation. A variety of containers or vessels can be used. For example, as shown in FIG. 1, a quartz tube 24 extends between first and second end plates 26, 28, and the end plates 26, 28 are disposed at the opposite ends of the tube 24 to seal the space 22 within the tube 24. A sealing member 30, such as deformable ring or gasket, can be disposed at the interfaces of the tube 24 and end plates 26, 28 to maintain the seal between the tube and end plates. In other embodiments of the present invention, the vessel 20 can be formed of other materials. Typically, the vessel 20 is formed of a material that is not electrically conductive so that the structural members 14, 16, 18 can be heated by an induction heating device disposed outside the space 22 without substantially inducing an electric current in the vessel 20. Further, the vessel 20 is typically formed of a material that can withstand thermal shock so that the vessel 20 does not break during or following heating of the structural members 14, 16, 18. For example, the vessel 20 can be formed of ceramic. If the vessel 20 is formed of quartz or another transparent or at least partially translucent material, the joining operation can be visually monitored through the vessel 20. Alternatively, the system 10 can be operated without the vessel 20, e.g., by blowing a stream of inert gas around the members 14, 16, 18 during a bonding operation.

Figure 3:
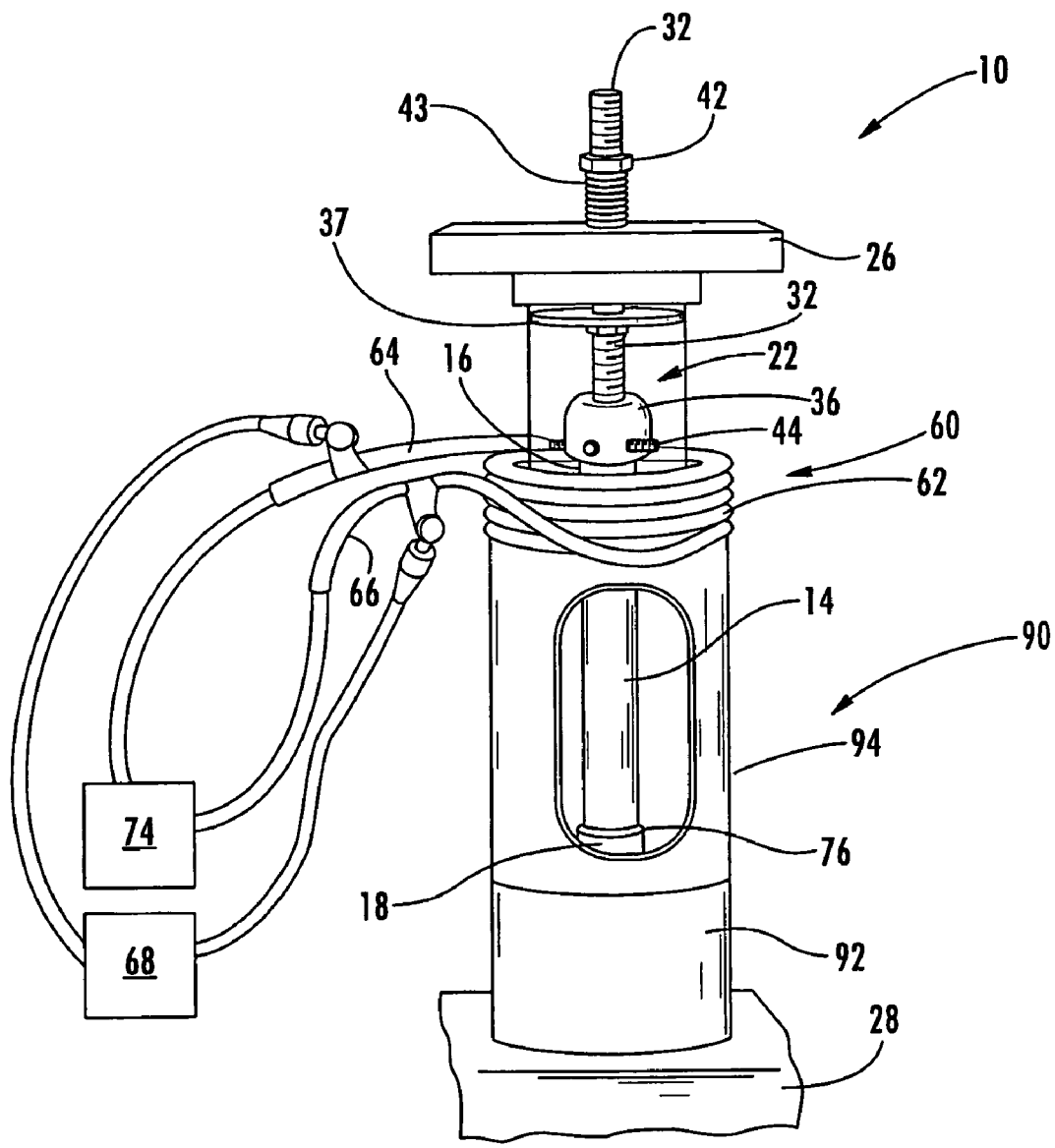
FIG. 3 is a perspective view illustrating a system for forming a joint between structural members to form a structural assembly according to another embodiment of the present invention.

A support structure extends through the vessel 22 and provides one or more surfaces for supporting the structural members 14, 16, 18 in a desired configuration during the joining operation. As shown in FIG. 1, the support structure is configured to support both the elongate member 14 and the first connector member 16. The support structure includes a threaded rod 32 that extends axially through the vessel 22. The rod 32 is connected to the second end plate 28, and the first end plate 26 defines an aperture for receiving the rod 32. One or more contoured support members 34, 36 are connected to the rod 32 such that the structural members 14, 16 can be supported in the desired configuration by the support members 34, 36. In this regard, the first support member 34 rests against a nut 38 on the rod 32, and the first support member 34 defines a circumferential shoulder 35 for aligning the elongate member 14 along the axis of the support structure. A second support member 36, for supporting the connector member 16, rests in a desired position on a nut 40 on the rod 32. Thus, the position of each support member 34, 36 can be easily adjusted according to the dimensions and configuration of the structural members 14, 16. That is, the nuts 38, 40 can be adjusted axially on the rod 32 to thereby adjust the distance between the support members 34, 36 and/or to adjust the position of the structural members 14, 16 in the vessel 20. A nut 42 opposite the first end plate 26 from the space 22 can be adjusted to urge the first end plate 26 against the second end plate 28, thereby sealing the space 22. A spring 43 can be disposed on the rod 32 between the nut 42 and the end plate 26 as shown in FIG. 3 to provide a substantially uniform pressure against the end plate 26, even if the pressure in the space 22 changes during operation. By removing the nut 42 from the rod 32, the first end plate 26 can be released, thereby opening the vessel 20, e.g., to insert or remove the structural members 14, 16, 18 before or after joining. Set screws 44 or other adjustable features can also be provided for connecting the support member 36 to the connector member 16, i.e., with the set screws 44 extending through the second support member 36 in a generally radial direction as shown in FIG. 1 to retain a flange 17 of the connector member 16. In addition, a reflective shield 37, such as an aluminum disk, can be provided to reduce heating of the sealing member 30.

The system 10 also includes a gas source 46 that is configured to provide a gas to the sealed space 22 of the vessel 20. For example, the gas source 46 can be fluidly connected via tubes 48, 50 that extend to ports 52, 54 defined through the end plates 26, 28. As shown in FIG. 1, the system 10 includes the two ports 52, 54, e.g., so that the gas source 46 can simultaneously deliver a gas to the space 22 through the first port 52 while gas is evacuated from the space 22 through the second port 54, i.e., to purge the space 22 of air. The gas source 46 typically provides an inert gas such as argon to the space 22 to prevent oxidation of the structural members 14, 16 during the joining operation. The particular gas to be used for an operation of the system 10 can be determined in part on the type of structural members 14, 16 to be joined and the type of joining operation that is to be performed. The gas source 46 can provide a variety of fluids and/or can provide an increased or decreased pressure in the space 22. In any case, the gas source 46 can include a vessel of pressurized gas, a compression device, an evacuation device, or the like. The gas source 46 can be configured to seal the space 22 after purging, or additional valves can be provided for that purpose. In some cases, the purging and/or sealing of the vessel 20 may be unnecessary for joining according to the present invention.

A heater 60 is provided in the system 10 for selectively heating and thereby joining the structural members 14, 16. As shown in FIG. 1, the heater 60 can operate by induction. That is, the heater 60 can include an induction coil 62 that extends circumferentially around the vessel 20. The opposite ends 64, 66 of the coil 62 are electrically connected to a power source 68 that provides an electrical current in the induction coil 62 to thereby generate an electromagnetic field and inductively heat the structural members 14, 16. In other embodiments, other types of heaters can be used, such as a radiant heater. In any case, the power source 68 of the heater can be controlled manually or automatically. For example, in one embodiment, a temperature monitoring device 70 measures the temperature of a particular portion of the structural members 14, 16, and the induction coil 62 is controlled accordingly. That is, a controller 72 can receive a signal from the temperature monitoring device 70 representative of the temperature, and the controller 72 can communicate with the power source 68 to adjust the power of the power source 68 accordingly to achieve or maintain a particular temperature in the structural members 14, 16.

Alternatively, an operator can adjust the power source 68 according to a temperature display provided by the temperature monitoring device 70. In either case, the temperature monitoring device 70 can be positioned outside the vessel 20 and configured to measure infrared or other radiation emitted from the structural members 14, 16. Other temperature monitoring devices can alternatively be used, and in some cases, the temperature monitoring device 70 can be positioned within the vessel 20. Alternatively, the temperature achieved through an induction heating process can be determined by monitoring the power supplied by the power source 68, e.g., as described in U.S. application Ser. No. 10/094,494, entitled "Induction Heating Process Control," filed Mar. 8, 2002, and which is assigned to the assignee of the present invention and is incorporated herein by reference.

A coolant source 74 can also be provided for circulating a coolant to control the temperature of the induction coil 62. For example, the induction coil 62 can be a hollow, copper, tube-like coil that extends circumferentially around the vessel 20, and the coolant source 74 can circulate a coolant fluid through the coil 62 to cool the coil 62. The coolant is typically a liquid, such as water, glycol, or the like, but a gaseous coolant can likewise be used. The coolant source 74 can include a pump or other device for delivering the coolant source through the coil 62.

The system 10 illustrated in FIG. 1 is configured to join the single connector member 16 to the elongate member 14 to form the structural assembly 12. In particular, the elongate member 14 is a tubular member with a circular cross-sectional shape. In other embodiments, however, the first structural member 14 can have other cross-section shapes, such as a square, triangle, ellipse, channel, angle, I-beam, other beam shapes, or the like. The connector member 16 illustrated in FIG. 1 is a lug or other connector that is configured to be partially received by and joined to the arm 14. Further the connector member 16 provides the flange 17 and/or another feature for connecting the structural assembly 12 to a device or structure. In other embodiments, the connector member 16 can be a variety of other types of connectors including, but not limited to, a clevis, a flat or contoured flange, a threaded or otherwise contoured rod, and the like. While both of the structural members 14, 16 are illustrated as tubular members, one or both of the members 14, 16 can be solid or can include internal members.

Figure 4:
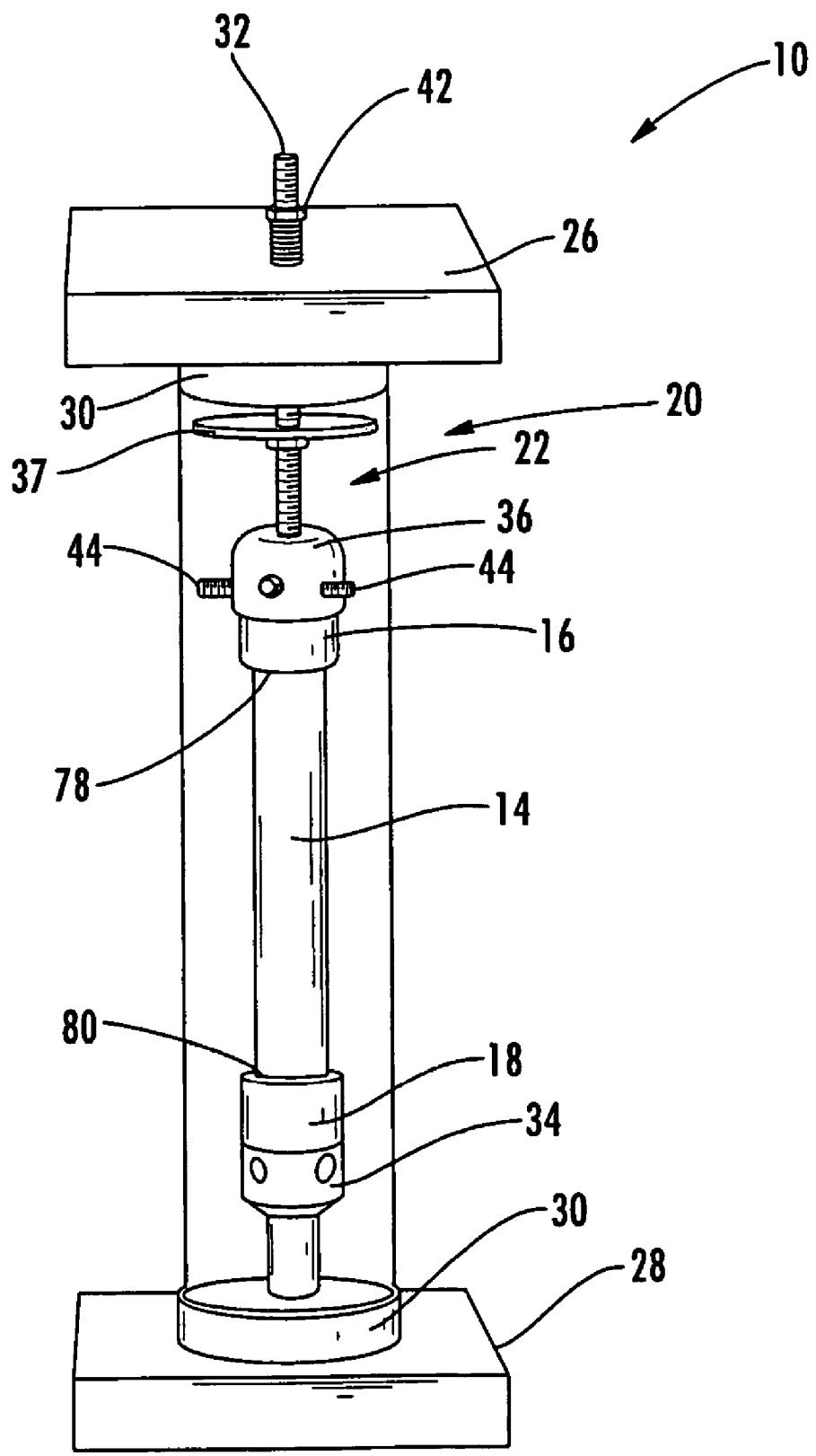
FIG. 4 is a perspective view illustrating the system of FIG. 3, shown with the joints formed between the structural members and without the induction coil.

According to one typical embodiment, the finished structural assembly 12 typically includes connectors at first and second ends of the elongate member 14. In this regard, FIGS. 3 and 4 illustrate the formation of the structural assembly 12 of FIG. 5 using three structural members, i.e., the elongate member 14, and two connector members 16, 18. In the illustrated embodiment, the elongate member 14 extends between opposite ends, and the ends are received by apertures of the connector members 16, 18. Thus, the resulting structural assembly 12 can be used to extend between two portions of a device or structure by connecting each of the connector members 16, 18 to the respective device or structure. In other embodiments, either of the connector members 16, 18 or an additional member can be disposed at, and joined to, other portions of the elongate member 14, e.g., at a point between the ends of the elongate member 14. In any case, each connector member 16, 18 can include various connection features for connecting to other devices or structures, including the flanges 17, apertures 19 extending axially through the connector members 16, 18, apertures 19a extending transversely through the connector members 16, 18 (FIGS. 7 and 8), or the like. In some cases, the apertures 19, 19a can be threaded to facilitate the engagement of the structural assembly 12.

The structural assembly 12 can provide desired characteristics, which can differ between the different structural members 14, 16, 18 of the assembly 12. That is, each structural member 14, 16, 18 of the structural assembly 12 can be formed of different materials, and each material can be selected to provide particular properties throughout the structural assembly 12. Typically, the elongate structural member 14 is formed of a material with directionally nonuniform properties, i.e., such that the properties of the structural assembly 12 differ according to the direction or axis along which the properties are tested. In particular, the elongate member 14 can be formed of a composite material such as a metal matrix composite (MMC). Metal matrix composites generally include a metal matrix material and a reinforcement material disposed in the matrix material. In the case of titanium matrix composites (TMC), the metal matrix is titanium or an alloy of titanium. In other types of MMCs, the metal matrix can instead be formed of aluminum, aluminum alloys, or other metals. Various types of reinforcement materials can be disposed in MMCs. In one TMC, the reinforcement material is a plurality of fibers including silicon carbide (SiC). For example, the silicon carbide can be disposed on carbon fibers. Alternatively, these or other reinforcement materials can be disposed as braided or woven tapes or sheets or otherwise configured in the matrix material. Metal matrix composites are further described in U.S. Pat. No. 5,410,133, titled "Metal matrix composite," which issued Apr. 25, 1995; U.S. Pat. No. 4,797,155, titled "Method for making metal matrix composites," which issued Jan. 10, 1989; and U.S. Pat. No. 4,699,849, titled "Metal matrix composites and method of manufacture," which issued Oct. 13, 1987, each of which is assigned to the assignee of the present application, and the contents of each of which is incorporated herein in its entirety by reference.

The configuration of the reinforcement material in the MMC determines, in part, the properties of the composite, including the variation of the properties according to the direction or dimension of the member. For example, in one embodiment of the present invention, the fibers are disposed in a substantially unidirectional configuration. That is, the fibers are disposed substantially parallel to one another and, typically, parallel to a longitudinal axis of the member. Further, the fibers can extend substantially continuously along the axial direction of the elongate member 14. With the fibers so configured, the strength of the member can be enhanced especially in the axial direction. In other words, the strength of the composite material of the elongate member 14 is anisotropic, such that the strength of the material is strongest in the axial direction and less strong in the non-axial directions. The overall strength of the elongate member 14, e.g., the load bearing capacity of the member, can also be greatest in the axial direction, though the overall strength of the member typically depends on the dimensions and configuration of the member as well as the directionality of its material properties.

Figure 6:
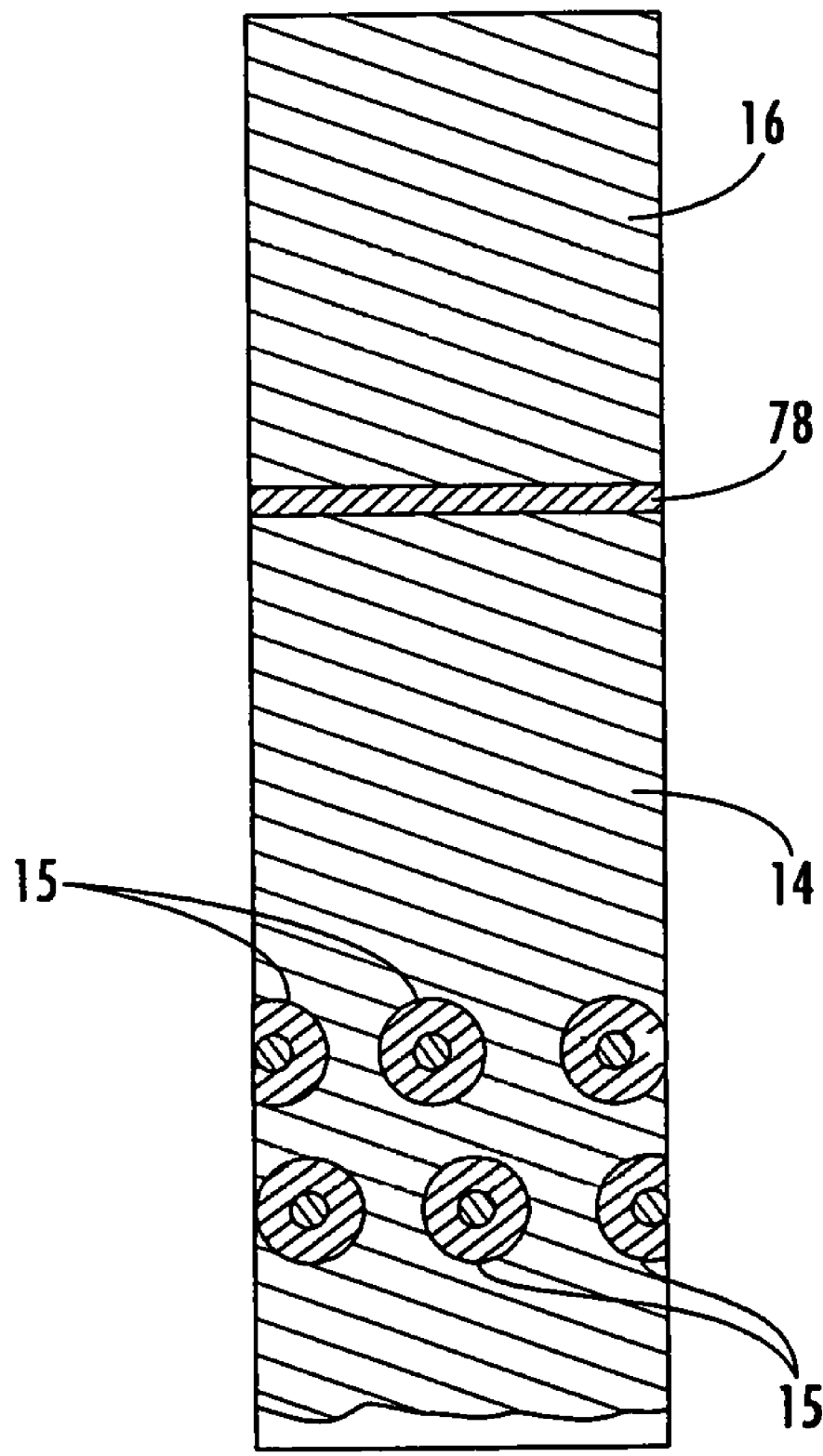
FIG. 6 is a section view illustrating the structural assembly of FIG. 5, as seen along lines 6-6 of FIG. 5.

For example, as shown in FIGS. 5 and 6, the elongate member 14 is tubular and silicon carbide fibers 15 are disposed parallel to the longitudinal axis of the member 14, i.e., in the direction of the X-axis as illustrated in FIG. 5. Thus, the member 14 is strongest in the axial direction and can therefore transmit high forces in the axial direction, e.g., to provide reactionary force against axial loading on the structural assembly 12. For example, when used as a brace, strut, connecting rod, or the like, the structural assembly 12 can be subjected to high axial forces without significant deformation or likelihood of failure. In fact, the material of the structural member 14 can more effectively transmit axial forces than other forces, such as a transverse force in the radial direction of the member 14.

In contrast, each connector member 16, 18 can be formed of a material that is dissimilar to the material of the elongate member 14. In particular, the material of the connector members 16, 18 can be selected to provide the necessary material properties of the connector members 16, 18. For example, the connector members 16, 18 can be formed of a material that has high strength, stiffness, toughness, corrosion resistance, and wear resistance. Further, the connector members 16, 18 can be formed of a material that has a similar strength in the axial direction (along the X-axis of FIG. 5) as well as the non-axial directions (i.e., the directions of the Y- and Z-axes), e.g., the material has substantially isotropic strength such that the strength of the material is not directionally dependent. For example, the connector members 16, 18 can be formed of a substantially homogeneous material such as steel, titanium, aluminum, other metals, and the like. In particular, high strength steel can provide the necessary properties for many applications without requiring that the connector members 16, 18 be excessively large. Further, forming the connector members 16, 18 of high strength steel can be faster, easier, and less expensive than forming the connector members 16, 18 of composite materials. The overall strength of the connector member 16, 18, e.g., the load bearing capacity of the members, is typically dependent on the dimensions and configuration of the member.

In some cases, the elongate member 14 can be formed of a material that has a high strength in a first direction, e.g., along the axis of the elongate member 14, that exceeds the substantially uniform strength of the material of the connector members 16, 18, while the material of the elongate member 14 has a strength in a second direction, e.g., transverse to the axis of the elongate member 14, that is less than the strength of the material of the connector members 16, 18. In other words, the elongate member 14 can be stronger in a primary loading direction than the connector members 16, 18, while each connector member 16, 18 is stronger than the elongate member 14 in directions in which the elongate member 14 is not typically loaded. For example, the material of the connector members 16, 18 can be generally stronger than the unreinforced matrix material of the elongate member 14, but the reinforced matrix material can be stronger, at least in the direction of the reinforcement material.

In particular, one conventional titanium matrix composite material formed of a matrix of Ti-6Al-4V with SiC reinforcement fibers has an ultimate tensile strength in a longitudinal direction that is about 1690 245 ksi (MPa) and an ultimate tensile strength in a transverse direction that is about 58 ksi (400 MPa), while the ultimate tensile strength of Ti-6Al-4V is about 138 ksi (950 MPa) in all directions. The use of stronger material for the elongate member 14 can reduce amount of material required for achieving a particular strength, thereby potentially reducing the weight of the assembly 12 relative to a similar assembly in which the elongate member is formed of the matrix material without reinforcement or of the same material as the connector members 16, 18. The weight reduction typically depends on the expected loads, the geometry of the assembly, and the particular materials used. In some cases, the weight savings for the elongate member 14 can be 33% or more for assemblies subjected primarily to tensile loads, and 50% or more for assemblies subjected primarily to compressive loads.

The elongate member 14 can be fully formed before the connector members 16, 18 are joined to the member 14. Thus, the elongate member 14 can be formed as a long continuous piece that is then cut into shorter sections for forming each structural assembly 12. Forming the elongate member 14 as a long piece can reduce the cost and time for forming a number of elongate members 14, especially where the elongate members 14 are formed of composite materials that require a complex lay-up process. Similarly, each connector member 16, 18 can be formed separately from the elongate member 14 before being connected to the member 14. Thus, e.g., if the connector members 16, 18 are to be machined to precise dimensions, the machining operation can be performed before the connector members 16, 18 are joined to the elongate member 14, thereby reducing the risk that the elongate member 14 will be damaged during the machining operation.

One or more of the connector members 16, 18 can be connected to the elongate member 14 by various joining operations. In particular, the system 10 of FIG. 1 can be used to braze the connector member 16, 18 to the elongate member 14. In this regard, a braze material 76 can be provided for forming braze joints 78, 80 between the members 14, 16, 18. Brazing typically refers to a process by which a braze material is disposed between two parent members and heated to a brazing temperature at which the braze material melts but the parent members remain unmelted, such that the braze material joins to the parent members to form a solder-like joint between the parent members.

As illustrated in FIGS. 1 and 5, the adjacent members 14, 16 can be configured to define interfaces or gaps 82, 84, and the braze material 76 can be received in each interface 82, 84. For example, if the connector member 16 has a smaller diameter than the elongate member 14 and is configured to be partially received by the elongate member 14, the braze material 76 can extend circumferentially around the connector member 16 and rested on the end of the elongate member 14 near the interface 82 as shown in FIG. 1. Then, as the braze material 76 is heated to the brazing temperature and melted, the braze material 76 is received, e.g., "wicked," into the interface 82. The molten braze material 76 can be disposed into the interface 82 and retained in the interface 82 by gravity, capillary action, and/or adhesion. In other cases, the braze material 76 can be disposed within each interface 82, 84 before the braze material 76 is melted, or the molten braze material 76 can be injected into the interfaces 82, 84 or urged into the interfaces 82, 84, such as by using a centrifuging device.

Figure 2:
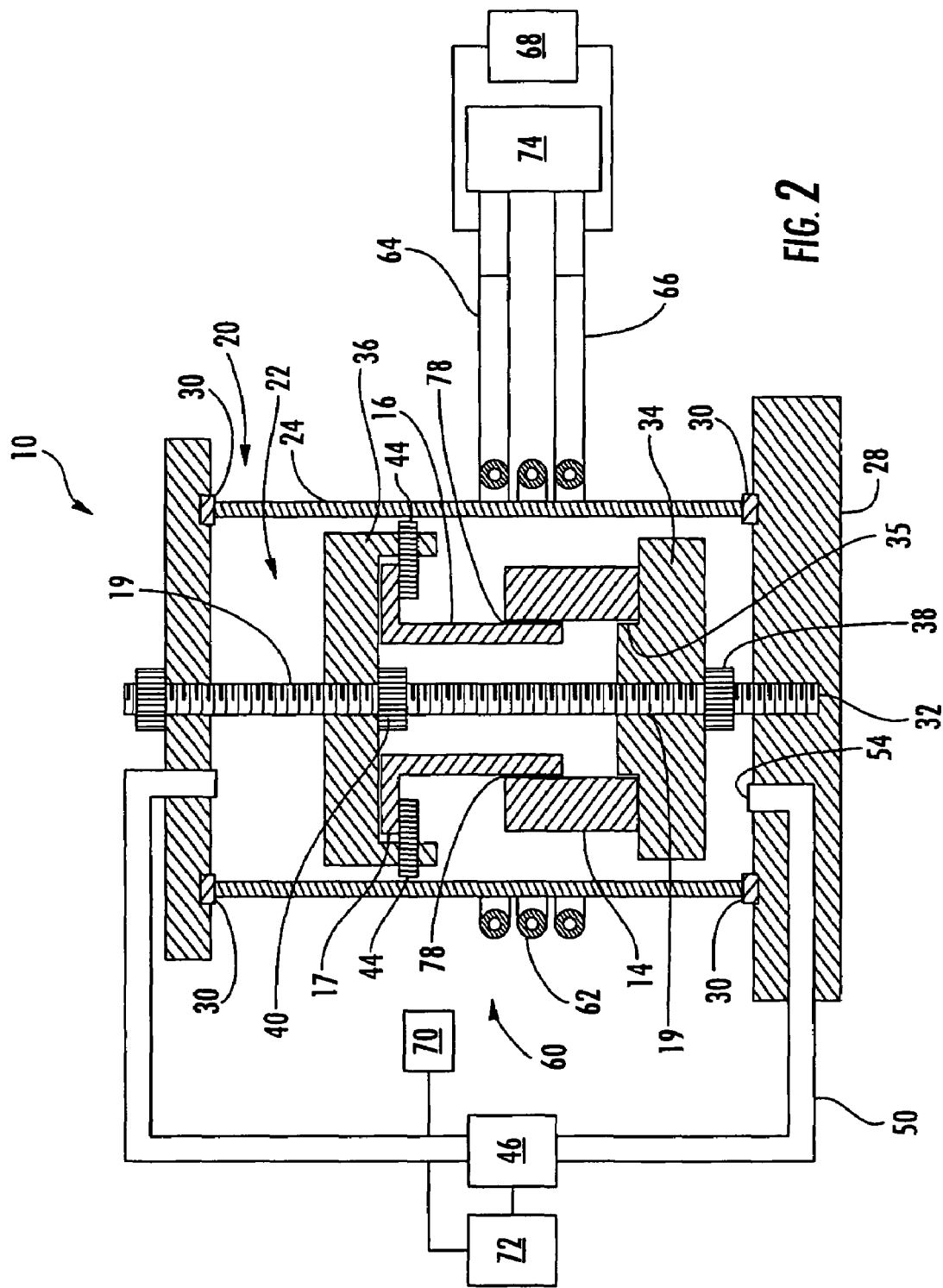
FIG. 2 is a section view schematically illustrating the system of FIG. 1 after the joint between the structural members has been formed.

As the braze material 76 cools, the material hardens to form the braze joint 78, as illustrated in FIG. 2. The solidified braze material 76 may define a fillet or otherwise contoured edge on either end of the interface 82. In some cases, the braze material 76 can be machined or otherwise processed, e.g., to remove excess material from the joints 78, 80.

The induction coil 62 can be used to heat the braze material 76 to form the braze joints 78, 80. Further, the induction coil 62 can be configured to selectively heat the braze material 76 and the structural members 14, 16, 18 immediately adjacent the braze material 76 to facilitate forming of the joints 78, 80. By the term "selectively," it is meant that the induction coil 62 can heat the braze material 76 while predetermined portions of the structural members 14, 16, 18 are not significantly heated. In this regard, the induction coil 62 can be positioned to proximate to braze material 76 and the location where each joint 78, 80 is to be formed, and the coil 62 can be shorter than the structural members 14, 16, 18 in the axial direction so that the induction coil 62 does not extend around other portions of the members 14, 16, 18. Thus, while the braze material 76 is melted and joined to the members 14, 16, 18, at least a portion of the members 14, 16, 18 can generally remain cooler than the braze temperature and, in some cases, significantly cooler than the heated braze material 76. In particular, if each connector member 16, 18 is formed of a high strength steel that has been heat treated to achieve desired properties in the member 16, 18, the member 16, 18 can generally remain cool enough to avoid affecting the properties attained by the heat treatment. Similarly, the elongate member 14 can generally remain cool enough to avoid affecting the configuration of the member 16, 18 and the properties of the MMC or other material from which the member 16, 18 is formed.

As shown in FIG. 4, a support block 90 can be provided for holding the induction coil 62 in the desired position. In fact, the support block 90 includes first and second members 92, 94 that extend circumferentially around the vessel 20. The members 92, 94 can be stacked, as shown in FIG. 4, to support the induction coil 62 adjacent the location of the first joint 78 between the elongate member 14 and the first connector member 16. Alternatively, the second member 94 of the support block 90 can be removed, and the induction coil 62 can rest on the first member 92 of the support block 90 so that the induction coil 62 is disposed adjacent the location of the interface 84 between the elongate member 14 and the second connector member 18. Various other devices can be used for supporting the induction coil 62 in the desired configuration. Further, in some cases, multiple induction coils can be provided, e.g., so that multiple joints can be formed simultaneously in the assembly 12. Alternatively, the induction coil 62 can be configured to be partially energized, i.e., along only a select length of the coil 62 so that only a portion of the structural assembly 12 that is adjacent the induction coil 62 is heated thereby.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of manufacturing a structural assembly, the method comprising:

providing an elongate member extending in an axial direction between first and second ends, the elongate member being formed of a metal matrix composite material including a plurality of fibers of a reinforcement material disposed in a metal matrix such that the metal matrix composite material is stronger in the axial direction than in non-axial directions of the elongate member;

providing a first connector member formed of a material dissimilar to the metal matrix composite material of the elongate member;

subsequent to said second providing step, heat treating the first connector member;

disposing the elongate member and the first connector member in an induction coil, wherein disposing the elongate member and the first connector member in the induction coil comprises supporting the elongate member and the first connector member at least partially in a space defined by a vessel with a support structure comprising first and second support members by adjustably positioning at least one of the first and second support members so as to operably engage the elongate member and the first connector member and to thereby adjust the position of at least one of the elongate member and the connector member in the vessel, and providing the induction coil extending circumferentially around the vessel such that the induction coil is configured to heat the braze material disposed within the induction coil, wherein supporting the elongate member and the connector member further comprises disposing a threaded rod axially through the elongate member and positioning the first and second support members upon the threaded rod with the elongate member and the connector member positioned therebetween; and subsequent to said heat treating step, generating an electromagnetic field proximate to the elongate member and the first connector member and thereby selectively inductively heating and melting a braze material received between the first connector member and the elongate member and thereby brazing the first connector member to the elongate member such that the braze material is heated while a portion of the first connector member is disposed outside the induction coil, the portion of the first connector member disposed outside the induction coil remaining cooler than the melting temperature of the braze material throughout said melting step in order to retain properties attained during said step of heat treating.

2. A method according to claim 1 wherein said melting step comprises brazing the first connector to the first end of the elongate member.

3. A method according to claim 2, further comprising:

providing a second connector member formed of a material dissimilar to the metal matrix material of the elongate member; and melting a braze material received between the second connector member and the elongate member and thereby brazing the second connector member to the second end of the elongate member.

4. A method according to claim 1 wherein said first providing step comprises disposing the fibers of the reinforcement material generally in the axial direction of the elongate member.

5. A method according to claim 1 wherein said first providing step comprises providing the metal matrix composite material of the elongate member being stronger in at least one dimension than the material of the first connector member, and wherein said second providing step comprises providing the material of the first connector member being stronger in at least one dimension than the matrix material of the composite material of the elongate member.

6. A method according to claim 1 wherein said first providing step comprises providing the matrix material including titanium.

7. A method according to claim 1 wherein said first providing step comprises providing the reinforcement material including silicon carbide.

8. A method according to claim 1, further comprising disposing the elongate member partially within an aperture defined by the first connector member, such that the elongate member and the first connector member are brazed with the elongate member disposed partially within the first connector member.

9. A method according to claim 1 wherein disposing the elongate member and the first connector member in the induction coil further comprises providing an inert gas to the space, and wherein providing the induction coil extending circumferentially around the vessel comprises providing the induction coil axially along only a portion of the vessel such that the induction coil is configured to heat the braze material disposed radially within the induction coil.

10. A method according to claim 1 further comprising biasing at least one of the first and second support members into operable engagement with the elongate member and the connector member.

11. A method according to claim 1 wherein the support structure further comprises first and second end plates mounted upon the threaded rod, and wherein the method further comprises adjustably positioning at least one of the first and second end plates upon the threaded rod so that the first and second end plates operably engage opposite ends of the vessel.

12. A method of manufacturing a structural assembly, the method comprising:

providing an elongate member extending in an axial direction between first and second ends, the elongate member being formed of a metal matrix composite material including a plurality of fibers of a reinforcement material disposed in a metal matrix such that the metal matrix composite material is stronger in the axial direction than in non-axial directions of the elongate member;

providing a first connector member formed of a material dissimilar to the metal matrix composite material of the elongate member;

subsequent to said second providing step, heat treating the first connector member;

disposing the elongate member and the first connector member in an induction coil, wherein disposing the elongate member and the first connector member in the induction coil comprises supporting the elongate member and the first connector member at least partially in a space defined by a vessel by disposing a support structure through the elongate member and the connector member and adjusting the support structure to thereby adjust the position of at least one of the elongate member and the connector member in the vessel, providing an inert gas to the space, and providing the induction coil extending circumferentially around the vessel and axially along only a portion of the vessel such that the induction coil is configured to heat the braze material disposed radially within the induction coil; and subsequent to said heat treating step, generating an electromagnetic field proximate to the elongate member and the first connector member and thereby selectively inductively heating and melting a braze material received between the first connector member and the elongate member and thereby brazing the first connector member to the elongate member such that the braze material is heated while a portion of the first connector member is disposed outside the induction coil, the portion of the first connector member disposed outside the induction coil remaining cooler than the melting temperature of the braze material throughout said melting step in order to retain properties attained during said step of heat treating.

13. A method according to claim 12 wherein disposing the support structure through the elongate member and the connector member comprises disposing a threaded rod axially through the elongate member.

14. A method according to claim 13 further comprising disposing first and second support members upon the threaded rod and adjustably positioning at least one of the first and second support members upon the threaded rod so that the first and second support members operably engage the elongate member and the connector member.

15. A method according to claim 14 further comprising biasing at least one of the first and second support members into operable engagement with the elongate member and the connector member.

16. A method according to claim 13 wherein the support structure further comprises first and second end plates mounted upon the threaded rod, and wherein the method further comprises adjustably positioning at least one of the first and second end plates upon the threaded rod so that the first and second end plates operably engage opposite ends of the vessel.

* * * * *

UNITED STATES PATENT AND TRADEMARK OFFICE
CERTIFICATE OF CORRECTION

PATENT NO. : 7,621,437 B2  Page 1 of 1
APPLICATION NO. : 11/059287
DATED : November 24, 2009
INVENTOR(S) : Nansen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 569 days.

Signed and Sealed this

Twenty-sixth Day of October, 2010

David J. Kappos
*Director of the United States Patent and Trademark Office*